Figures 1, 2:
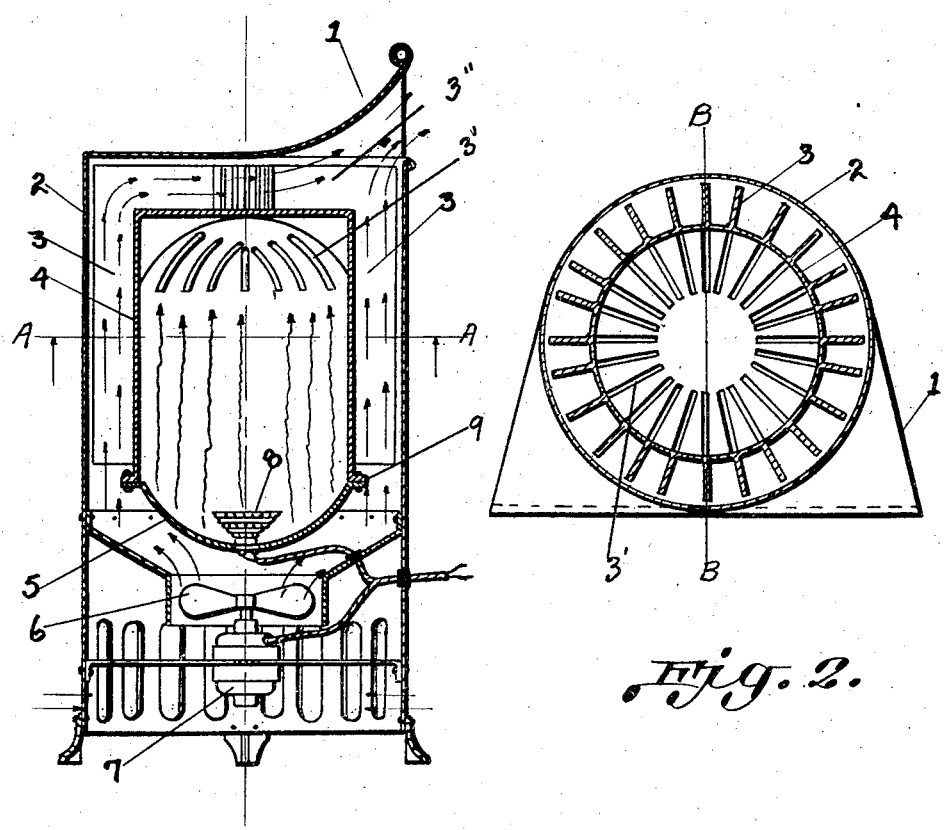

April 15, 1930.  E. F. FISHER  1,754,232

RADIANT HEATER

Original Filed Feb. 4, 1927

Witnesses  INVENTOR

Patented Apr. 15, 1930

1,754,232

UNITED STATES PATENT OFFICE

ERNEST F. FISHER, OF ST. LOUIS, MISSOURI, ASSIGNOR TO FANAIRE HEATER COMPANY, OF ST. LOUIS, MISSOURI, A CORPORATION OF MISSOURI

RADIANT HEATER

Application filed February 4, 1927, Serial No. 165,889. Renewed February 5, 1930.

This invention relates to heating apparatus of the general type described in my pending application for patent Serial No. 164,089, filed January 27, 1927, which apparatus is composed of a heat absorber capable of absorbing luminous and non-luminous ether waves, a heating device, a reflector combined with said heating device and heat absorber in such a way that it will intercept and gather together heat waves emanating from said heating device and project said heat waves onto the heat absorber, and means for causing air to circulate in contact with said heat absorber, abstract heat from the same, and then escape into the room or compartment in which the apparatus is located, or flow through a conduit leading to a space which it is desired to heat.

The object of my present invention is to provide a heating apparatus of the general type mentioned, in which the heating device, the reflector, and the heat absorber are combined in a novel manner that prevents the air which is being heated from coming in contact with the heating device, thereby insuring the utilization of all of the heat waves from the heating device and making it possible to maintain the heating device at a substantially constant temperature.

To this end I propose to construct the heat absorber of the apparatus in the form of a gas-tight shell made of material that is capable of freely absorbing and freely emitting luminous and non-luminous ether waves, and arrange an electrically-operated heating device inside of said shell in proximity to a curved reflecting surface that gathers heat waves emitted by the heating device and projects said heat waves onto a portion or portions of said shell from which heat is abstracted by the air that circulates through the casing of the apparatus. The said shell can either be filled with a gas, such as ammonia gas, carbon-dioxide gas, or any other suitable gas that is capable of absorbing heat waves and transferring said heat by conduction to the shell, or the interior of said shell may be devoid of gases and maintained at a minus pressure.

Figure 1 of the drawings is a vertical sectional view of a heating apparatus constructed in accordance with my invention, taken on the line B—B of Figure 2; and Figure 2 is a horizontal sectional view, taken on the line A—A of Figure 1.

In the accompanying drawings 2 designates a vertically-disposed, cylindrical casing which is provided at its lower end with air inlets and provided at its upper end with an air outlet, formed by a diffuser or deflector 1 that causes heated air to be directed laterally from the apparatus into the room in which the apparatus is located, or into a conduit that leads to a space which it is desired to heat. A gas-tight shell 4 is arranged inside of the casing 2 in spaced relation with the side wall and top of said casing, so as to form a passageway through which a current of air is circulated by means of a fan 6 driven by an electric motor 7, or in any other suitable way. The bottom end wall of the shell 4 is formed by a concavo-convex-shaped reflector 5 whose peripheral edge is attached to a flange 9 at the lower end of the side wall of the shell 4, preferably by a gas-tight joint. The heating device of the apparatus consists of an electrically-operated heating element 8 that is arranged inside of the shell 4, preferably in the focal point of the reflector 5. If desired, radiating fins 3, 3' and 3'' can be attached to the interior and exterior of the shell 4, as shown in Figure 1, so as to increase the heat absorbing area and the heat radiating area of said shell. The shell 4 can either be filled with a gas, such as ammonia gas or carbon-dioxide gas, that will absorb heat waves from the heating device 8 and transfer the heat to the shell 4 by conduction, or the interior of the shell 4 can be devoid of gases and maintained at a minus pressure.

When the apparatus is in operation, the heat waves emanating from the heating device 8 will be gathered by the reflector 5 and projected upwardly onto the side wall and top wall of the shell 4. Consequently, the air which the fan 6 forces upwardly through the casing 2, as indicated by the arrows in Figure 2, will absorb heat from the shell and will become heated to a high temperature in traveling upwardly to the air outlet at the upper end of the casing. In view of the fact that the heating device 8 of the apparatus is arranged on the inside of the shell and is thus prevented from being acted upon by the air which circulates through the casing, practically all of the heat waves from the heating device will be utilized, thereby producing an exceptionally efficient electrically-operated air heater. Moreover, as no air comes in contact with the heating device 8 of the apparatus, it is possible to maintain said heating device at a substantially constant temperature when the apparatus is in operation.

I claim:

1. A heating apparatus, comprising a tight shell formed of material that is capable of freely absorbing and freely emitting thermal radiations, an electrically-operated heating device arranged inside of said shell, means for causing air to circulate over said shell and abstract heat from the same, and a reflector, separate and distinct from said circulating means for gathering heat waves emanating from said heating device and projecting said heat waves onto said shell,.

2. A heating apparatus, comprising a heat absorber consisting of a gas-tight shell filled with a gas, an electrically-operated heating device arranged inside of said shell, means for causing air to circulate over said shell and abstract heat from the same, and a reflector, separate and distinct from said circulating means for gathering heat waves emanating from said heating device and projecting said heat waves onto said shell.

3. A heating apparatus, comprising a casing provided with an air inlet and an air outlet, a fan for causing air to circulate through said casing, a heat absorber in said casing arranged to be acted upon by the air circulating through the casing and composed of a shell provided with fins, an electrically-operated heating device inside of said shell, and a concavo-convex-shaped reflector combined with said heating device for gathering heat waves emanating from said heating device and projecting them onto said shell.

4. A heating apparatus, comprising a casing, means for causing air to circulate through said casing, a gas-tight shell in said casing arranged so as to be acted upon by the air which circulates through the casing, a concavo-convex-shaped reflector that forms one end wall of said shell, and an electrically-operated heating device located in the focal point of said reflector, whereby the heat waves emanating from said device will be gathered by said reflector and projected onto said shell.

ERNEST F. FISHER.